United States Patent [19]

Barkatt et al.

[11] 4,332,031
[45] May 25, 1982

[54] SILICA REMOVAL PROCESS AND ALUMINA COMPOSITION USED THEREIN

[75] Inventors: Aaron Barkatt, Hyattsville, Md.; Pedro B. Macedo, 6100 Highboro Dr., Bethesda, Md. 20034

[73] Assignees: Pedro B. Macedo, Bethesda; Theodore A. Litowitz, Silver Spring, both of Md.

[21] Appl. No.: 132,588

[22] Filed: Mar. 21, 1980

[51] Int. Cl.³ .................. G21C 19/32; B01J 21/02
[52] U.S. Cl. .................................. 376/313; 252/432; 210/670; 210/673
[58] Field of Search .............. 176/37; 252/631, 432; 210/660, 670, 673, 679, 683, 685; 376/310, 313, 328

[56] References Cited

U.S. PATENT DOCUMENTS

| 1,860,781 | 5/1932 | Liebknecht | 210/670 |
| 2,402,959 | 7/1946 | Gustafson et al. | 210/673 |
| 2,504,695 | 4/1950 | Jukkola | 216/683 |
| 3,928,192 | 12/1975 | Katzakian et al. | 210/683 |
| 4,073,683 | 2/1978 | Van der Schoot | 176/37 |

OTHER PUBLICATIONS

J. Hicks, Recent Concerns with Reactor Coolant Chemistry in Pressurized Water Reactors, 29 Nuclear Technology 146 (1976).

Primary Examiner—Sal Cangialosi
Attorney, Agent, or Firm—Cushman, Darby & Cushman

[57] ABSTRACT

Silica is selectively removed from aqueous liquid containing a relatively large amount of borate (or boric acid) and a relatively small amount of silica using borate loaded alumina as the sorbant. The effluent can be passed through lithium loaded cation exchange resin to remove any dissolved aluminum.

16 Claims, 7 Drawing Figures

SILICA REMOVAL PROCESS AND ALUMINA COMPOSITION USED THEREIN

BACKGROUND OF THE INVENTION

The purification and recycling of cooling water in light water reactors requires efficient removal of traces of silica from this water in order to prevent silica deposition on the heat exchange tubes of the reactor. However, the problem of silica removal is greatly complicated by the presence of a large excess of borate (typically about 100 to 10,000 times more borate than silica) introduced to control the neutron flux. In such reactors a very high degree of uniformity in operating conditions is required. If borate were to be removed along with the silica, this would cause great expense and technical difficulty because of the necessity to add fresh borate to the recycled water. Also, the absorption and filtration medium would be exhausted at a rate larger by about three orders of magnitude than if silica alone were to be removed. The desired purification system should therefore be capable of efficiently separating silicate from borate and retaining the silica on the purifying medium while avoiding depletion of the borate concentration in the recycled water. Separation of silica from ions which may be present in the water but, unlike silica, do not carry the risk of solid precipitation (e.g., $Li^+$, $Cl^-$, $NO_3^-$) is also desirable.

The term silica as used herein includes the various forms of silica that may be present in any aqueous solution including $Si(OH)_4$, silicates, and colloidal silica.

Organic, synthetic resin ion-exchange columns are used for the vast majority of ion-exchange separations in modern chemical operations. Some separations are relatively simple and may even be quantitative. However, the problem of picking up silica on an ion-exchange resin, even in the absence of interfering ions, is not simple. In routine ion-exchange separations, silicate is preferably left in the effluent, rather than deposited in the ion-exchange column.

Even supposing that silica could be efficiently and cleanly separated on ion-exchange resins, its separation from an overwhelming excess of borate represents a problem to which no solution based on the use of resins has yet been found. The use of strongly basic anion exchangers necessary for removing the extremely weak silicic acid would also take up other weak acids such as carbonic and boric acids. Silicic acid is the weakest of these three acids, with a dissociation constant of $2.1 \times 10^{-10}$, slightly below that of boric acid ($7.3 \times 10^{-10}$).

The situation is further complicated by the fact that boric acid, despite its low dissociation constant value, tends to be absorbed very firmly even by certain weakly basic resins. The greater tendency of borate to adhere to a basic resin as compared with silicate is illustrated by the observation that the gluconate form of a strongly basic resin can be used to retain borate while silicic and hydrocyanic acids pass into the effluent.

Cation exchangers, which are effective in removing cations from borate solutions in the presence of silicate, leave the silica in the effluent together with the borate, and even mixed-bed columns, consisting of a mixture of a strongly acidic cation exchanger and a weakly basic anion exchanger, retain the metal cations but allow other weak acids to exit with the boric acid in the effluent. Soluble silicate and even colloidal silica appear in the effluent, although some precipitated silica accumulates on the ion-exchange resin. Sequential arrangements of cation and anion-exchange columns likewise remove only metal cations and anions of strong acids from boric acid solutions.

It is generally recognized in the chemical literature that inorganic ion exchange materials, especially those based on alumina and silica, are inferior with regard to versatility, stability and selectivity as compared with organic ion exchange resins, which can be "tailor-made" for specific separations and are very versatile and extremely stable under a wide variety of conditions. While a few separations of specific cations, such as $Cu^{++}$ and $Li^+$, have been accomplished by means of inorganic ion exchanges, their main use has been limited to non-specific de-ionization, for instance, in softening and desalination of water, rather than in analytical separations. Even in non-specific applications they have been largely displaced by organic resins. In order to perform specific separations the approach generally accepted at present is to choose among the "tailor-made" organic exchange resins and to optimize the conditions of their use rather than to attempt using inorganic media based on silicates and aluminates.

Highly-selective, "tailor-made" organic resins would appear to be even more preferable in attempting the separation and removal of an ion present at very small concentrations, e.g., silicate, from a solution containing a large excess of another ion, e.g., borate, which is comparable to the former ion in terms of acid-base properties.

It is therefore unexpected that inorganic ion exchange media would prove more useful than specific organic resins under the stringent requirements for high selectivity that exist in a high concentration borate-low concentration silica system, e.g., as in the pressurized water reactor coolant.

Various modifications of alumina have been shown in the art to be capable of picking up ions from solution through a mechanism of ion exchange, absorption, physical adsorption on the surface, or a combination of any of the above. For convenience these mechanisms will be referred to herein as adsorption, without intending to exclude any other reaction mechanisms. The same is true of other hydrous oxides, such as those of iron, thorium, manganese, zinc and magnesium. Because of its amphoteric character, alumina washed with an alkali solution can function as a cation exchanger, while in acidic solution alumina functions as an anion exchanger. The large dependence on pH has been ascribed to the equilibrium equation:

$$Al(OH)_2^+ + OH^- \rightleftarrows Al(OH)_3 \rightleftarrows AlO(OH)_2^- + H^+$$

As a cation exchanger, alumina has been shown to adsorb $Li^+$ from a solution containing other cations at a carefully controlled pH of 12.6. As an anion exchanger, the properties of alumina are sensitively dependent on pH, surface area and structure.

Anions such as fluoride, oxalate and sulfate can be removed from solutions in preference to phosphate, perchlorate, chloride and nitrate, and they release hydroxide anions from alumina and similar hydrous oxides leading to an increase in pH.

The limitations generally recognized in adsorption and separation of ions by means of surface-active hydrous alumina include the following problems:

a. As a result of the combination of ion exchange and surface adsorption on alumina and similar hydrous oxides, selectivity is usually low and complete elution is difficult.

b. To achieve selective separations, it is necessary to make use of the amphoteric nature of the alumina by adjusting the pH to various values during operation. This requires the addition of relatively large volumes of electrolytes.

c. Ion exchange is most efficient at very high (12–13) or very low (−1 to +1) values of pH. However, alumina is soluble to a considerable extent in strongly acidic and strongly basic solutions, and the effluent can be expected to be contaminated with significant levels of dissolved aluminum.

d. The capacity of alumina, as measured at a pH of more than one, is about 0.17 meq/ml of column, which is much less than the capacity of an organic anion-exchange resin.

e. Activated alumina cannot be used for some separations because certain solute types undergo chemical reactions such as oxidation, complex formation and polymerization at the reactive sites.

f. The limitation which appears to be most serious in attempting the separation and removal of silicate from boric acid solutions is that the strongly basic sites of alumina show a preferential adsorption of acidic species according to their acid strength. Strong acids are most strongly bound, while the weaker acids can be separated in order of their $pk_a$ values when basic (or, to a lesser extent, neutral) eluents are used. Since boric acid ($k_a = 7.3 \times 10^{-10}$) is slightly stronger than silicic acid ($k_a = 2.1 \times 10^{-10}$), silicate is not expected at first sight to adhere preferentially to alumina in the presence of borate.

Alumina, as well as other metal oxides, especially those of iron and magnesium, and metal powders, such as iron and aluminum, have been used to remove silica from water, especially from boiler feed water, to prevent the formation of scales, although in general organic ion exchange resins are preferred at present in reducing silica concentrations.

The effectiveness of alumina in adsorbing silica depends strongly on pH. A basic pH is favored for preparation of the alumina as well as during the adsorption process itself, where optimum removal is obtained around pH 8. The pH is maintained below about 9 (and above about 5) to prevent introduction of dissolved ionic aluminum. The addition of salts such as $MgSO_4$ and $Fe_2(SO_4)_3$ has been known to improve the results, and NaCl is particular is known to enhance silica removal from the liquid by forming colloidal aluminosilicate flocculant. However, flocculation techniques are usually inefficient and the introduction of added salts requires their removal by other means such as cation exchange resins.

The use of various aluminas has been reported to result in reductions of silica levels in water, e.g., from 68 to 5 ppm (Behrman et al, Ind. Eng. Chem. 32, 468 (1940)-), from 95.2 to 2.8 ppm (Lindsay et al, Ind. Eng. Chem. 31, 859 (1939)), and from 140 to about 70 ppm and in the presence of NaCl to about 20 ppm (Wey et al, Colloq. Intern., Centre Natl. Rech. Sci. (Paris) 105, 11 (1962)). Wohlberg et al, Los Alamos Report, LA-5301-MS (1973) indicates that silica levels in tap water of approximately pH 8 can be reduced from about 82 ppm to below one ppm employing a column of 80-20 mesh adsorbent alumina. These investigators also reported treating a higher silica concentration solution from a cooling tower employing stirred alumina in a beaker and obtaining a reduction in silica content from 146 ppm to only 83 ppm. The efficiency of the process depends not only on the pH of adsorption (see above) and the pH of previous treatment of the alumina (basic alumina reduces silica levels from 82 to 1.8 ppm, acidic alumina to 0.8 ppm, neutral alumina to one ppm), but also on grain size and structure. Granular activated alumina (Behrman et al), dried, hardened gel (Liebknecht U.S. Pat. No. 1,860,781), and freshly precipitated alumina (Lindsay et al), have been specified for use in silica removal.

In summary, survey of the literature shows that alumina and inorganic hydrous oxides are generally considered less effective and less useful than organic ion exchange resins in separatory processes. Most seriously, the specificity of alumina in removing silica from solutions containing an excess of other ions has not been identified in the prior art.

Moreover, according to the literature, e.g., Perry et al, Practical Liquid Chromatography, Plenum Press, New York (1972), pages 62–64, alumina is not expected to separate and remove silica from solutions of anions of stronger or comparably strong acids, such as borate ion, and is expected to be inferior in selectivity as well as in stability, versatility and capacity in comparison with organic ion-exchange resins.

The use of alumina to remove boron, i.e., borates, from solution is shown in Gustafson U.S. Pat. No. 2,402,959. This patent is not concerned with treating solutions containing silica as well as borates.

In the specification and claims unless otherwise indicated, when reference is made to the amount of silica, it is expressed as ppm (parts per million) calculated as silicon and, when reference is made to the amount of borate, it is expressed as ppm calculated as boron. Unless otherwise indicated, all parts and percentages are by weight.

SUMMARY OF THE INVENTION

It has now been found quite unexpectedly that certain novel boron-modified aluminas can be successfully employed in novel processes to selectively separate small amounts of silica which are in admixture with much larger amounts of borates (including boric acid) in an aqueous medium.

It is a preferred embodiment of the invention to pretreat alumina with borate to substantially saturate the alumina with borate prior to use of the alumina to selectively remove silica from the borate-and silica-containing aqueous reactor coolant. In the absence of such pretreatment, initial passage of the coolant into the alumina will cause an appreciable deposition of borate on the alumina and an appreciable undesirable decrease in the borate concentration of the coolant. Borate is removed from the coolant until the alumina becomes essentially saturated with boron, i.e., after several column volumes of coolant have passed through a column of the alumina. Such an initial variation in the concentration of the coolant is very disadvantageous in applications such as in the primary cycle of a pressurized light water reactor where a high degree of uniformity of all conditions must be maintained. Since borate concentration controls neutron flux in the reactor, a drop in borate concentration would result in an unwanted increase in power of the reactor.

We avoid such initial change in conditions by pretreating the alumina to essentially saturate it with boron, using a pretreatment solution whose borate concentration may be the same or different from that of the aqueous medium to be purified by silica removal.

In some cases where provision is made to counteract the initial variations in conditions, the alumina may be borated in situ by the initial flow of several column volumes of aqueous medium to be purified.

The borate-loaded alumina of the invention is successfully able to selectively remove small amounts of silica from a borate-rich aqueous medium containing up to about 5000 ppm or higher (as boron) of borate. The selective removal of such small amounts of silica from borate-rich water is indeed quite unexpected, especially since silicic acid is a weaker acid than boric acid. One would not expect the relatively weak acid ion (presumably silicate) to displace the relatively stronger acid ion (presumably borate) in/on the alumina. This selective removal is even more unexpected when one considers the relatively trace amounts of silica contained in the borate-rich water being treated according to the inventive process.

Another aspect of the invention is directed to novel compositions, boron-modified alumina, characterized by: (a) a surface area of at least 20 square meters per gram of alumina; (b) boron chemically bonded to said surface of the alumina; (c) a concentration of said chemically bonded boron in the range of from about 0.005 to about 3 weight percent, preferably about 0.1 to about 1 weight percent, based on the alumina; and (d) a standard capacity value within the range of about $10^{-1}$ to about $10^{-5}$ gram of silica (calculated as silicon) per gram of alumina. In desirable embodiments the boron modified alumina is granular and activated in the sense that it is prepared from activated alumina.

DETAILED DESCRIPTION OF THE INVENTION

Figure 1:
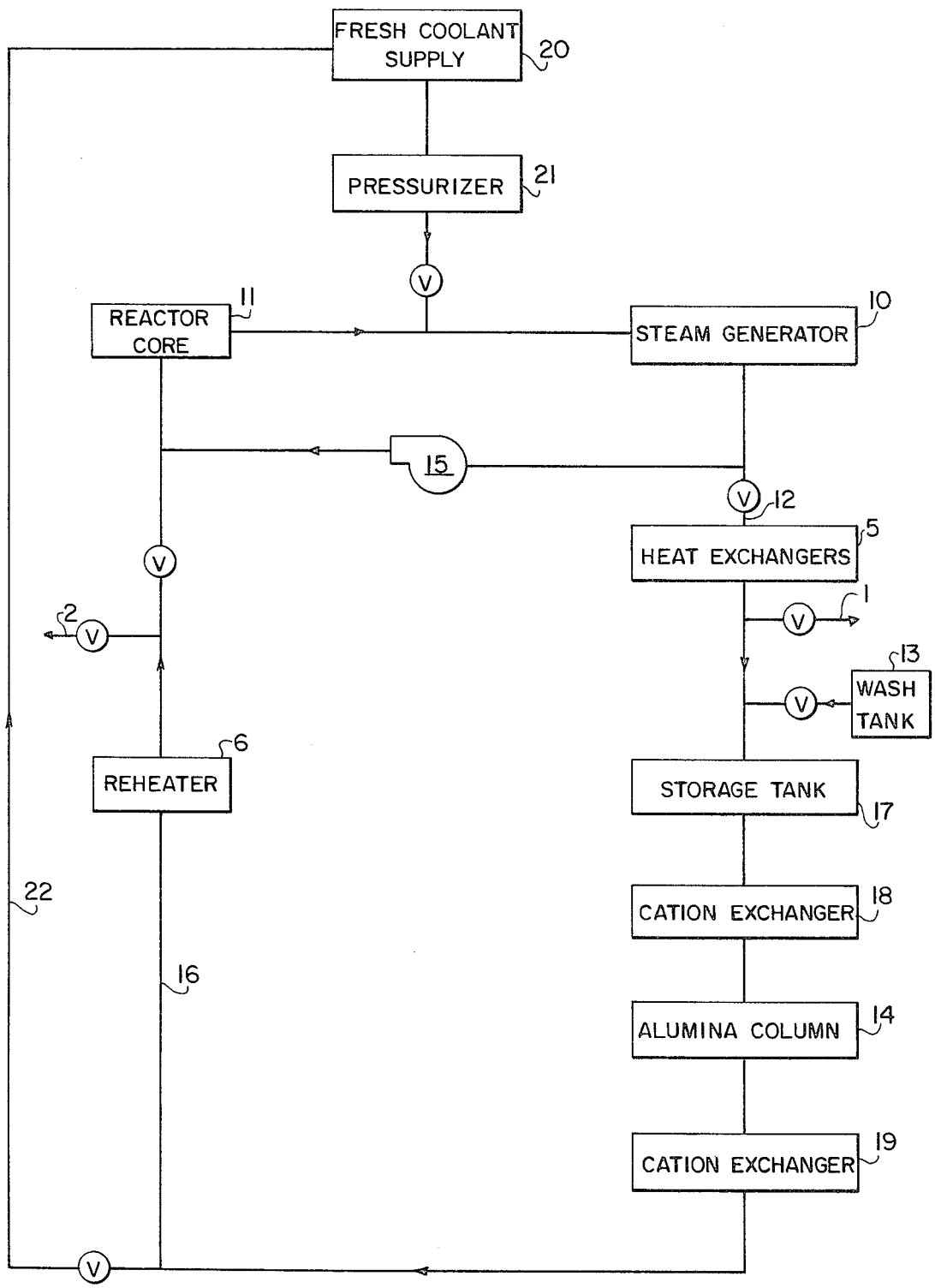
FIG. 1 is a schematic view of a typical coolant purification system according to the present invention.

Before proceeding further, it is deemed advisable to define the term "standard capacity" as used herein including the claims. The term "standard capacity" of the novel boron-modified alumina represents the amount of silica (calculated as silicon) which can be sorbed by one gram of boron-modified alumina from an influent containing 1 ppm silicon present as silicate and 1000 ppm of boron present as boric acid with the pH adjusted to 6.5, at ambient temperature, i.e., about 23° C., through a packed cylindrical column of such alumina whose height is eight (8) times its internal diameter, at a flow rate of one volume of influent per volume of alumina column every two minutes, the flow continuing until the amount of silicon in the effluent essentially equals the amount of silicon in the influent.

The standard capacity of the novel boron-modified alumina which is contemplated in the practice of the novel process is within the range of about $10^{-1}$ to about $10^{-5}$ gram of silica (calculated as silicon) per gram of alumina and preferably about $10^{-2}$ to about $10^{-4}$ gram Si/gram $Al_2O_3$. For optimum results in the commercial sense, the particular boron-modified alumina of choice will be primarily governed by economic factors, ease of influent flowability through a bed (or column) of such alumina, the materials chosen for the preparation of the modified alumina, their characteristics, and other considerations. Boron-modified aluminas having standard capacity values outside the aforesaid ranges are not particularly desirable in the commercial practice of the novel process. In effect, the standard capacity value of the novel boron-modified alumina is a measure of the sites available on (and in) such alumina for the sorption of silica in the practice of the novel process. An alumina characterized by a relatively large standard capacity value would indicate a greater number of such sites available for Si than would be the case with an alumina characterized by a relatively low standard capacity value.

The invention is directed to removing relatively small amounts of silica from an aqueous reactor coolant medium which contains much larger amounts of borate therein which comprises passing said aqueous medium through a bed of boron-modified alumina, said alumina being substantially saturated with borate and containing less silica contamination than its capacity for silica. The novel process is particularly useful in removing such small amounts of silica from aqueous media in which the concentration of boron is about 100 and upwards to 10,000 times, and more, than that of the silica. In the practice of particular useful embodiments of the invention, the amount of the silica contaminant is of the order of a few ppm, e.g., about 5 to 10 ppm and as low as 0.3 ppm, and lower, in an aqueous medium which contains upwards of several thousand ppm of boron, e.g., about 500 to about 4,000 ppm or higher.

The invention is particularly useful in pressurized water reactors where it is important to reduce the amount of silica to below 1 ppm while at the same time not reducing the amount of borate present. Desirably, the silicon is reduced to below about 200 ppb (parts per billion) to as low as about 30 ppb or even lower. Thus, a solution initially containing 10 ppm silica can have the amount of silica reduced to below about 50 ppb or even below about 20 ppb.

Lithium is also frequently present, e.g., as lithium borate, and/or lithium hydroxide, in amounts of from about 0.2 to about 10 ppm lithium to regulate pH of the solution in the reactor.

In one embodiment, a small amount of lithium (as lithium hydroxide), e.g., from about 0.2 to about 10 ppm of Li, is added to the aforesaid aqueous medium of boric acid to control the pH. The lithium is deposited along with the boron on the alumina to an amount of about 5 to 100 ppm lithium (calculated as the weight of Li divided by the weight of the dry modified alumina).

Initially, fresh alumina can adsorb borate and lithium from the solution. This causes the pH of the coolant solution to rise which is undesirable since dissolution of alumina into the coolant increases with increasing pH, in particular at a pH above 9. Upon recycling the aluminum-contaminated coolant to the reactor heat exchanger reaction or combination of the aluminum with silica can occur forming aluminum silicate deposits on the heat exchanger tubes and the reactor core. In a nuclear reactor system which demands careful monitoring such deposits may cause undue temperature fluctuations leading to dangerous upsets.

It is preferred that the alumina be saturated beforehand with borate. This can be accomplished by passing boric acid or borate solution therethrough until there is no more boron pickup, i.e., the concentration of borate in the effluent is approximately equal to the concentration of borate in the influent. Thereafter the coolant can be passed through the alumina without substantial change in pH or borate concentration and therefore without essentially disturbing the neutron flux in reactor.

The pH during pretreatment of the alumina with boric acid is maintained above about 4.5 and below about 9, preferably between about 5 to about 8, and most preferably at about neutral, i.e., pH of $7 \pm 0.5$.

In some applications, the alumina may be saturated with borate in the column by the initial flow of solution to be purified. As indicated above, this causes undesirable initial pH and concentration fluctuations. In such applications, provision should be made to accommodate such fluctuations, for example, by discarding the first few column volumes, e.g., up to about 10, of solution, by introducing the initial flow through the column into a much larger body of solution to dilute and minimize the fluctuations, and/or by regulating the pH of the initial flow through the column, e.g., by using an ion exchange resin.

Thus, it should be understood that in this specification and claims, references to alumina substantially saturated with boron includes so treating the alumina beforehand with another solution (which is presently preferred) or with the initial flow of solution to be purified.

During both the alumina pretreatment and the process of removing silica, it has also been found desirable to employ relatively low temperatures, e.g., 30° C. or lower to prevent dissolution of the alumina. Thus, in one series of experiments it was found that the aluminum concentration in the solution after passing through the bed of activated alumina was 40 ppb at 20° C. and 400 ppb at 75° C.

Ammonium may be used instead of lithium to control the pH of the coolant in the reactor, e.g., between about 6 to about 8. Ammonium is deposited on the alumina in an amount to substantially saturate the alumina with ammonium.

The novel boron-modified alumina which is contemplated in the practice of the invention can be prepared by subjecting alumina, desirably activated and granular in form and characterized by the appropriate standard capacity values as aforesaid, to the purification technique illustrated in working Examples 2-6. The purified, wet alumina is loaded in a column, tube, or other practical container configuration utilized in the art, desirably fabricated from an inert material such as stainless steel or an inert plastic, and thereafter an aqueous solution containing from about 500 to about 10,000 ppm, preferably upwards to about 4000 ppm, e.g., about 1000 to about 4000 ppm of boric acid, is passed through the alumina column at a flow rate of, for example, 30 ml/min cm². The flow rate does not appear to be critical. The flow is continued until the alumina is substantially saturated with boron under the conditions present, i.e., until the concentration of boron in the effluent is essentially equal to the concentration of boron in the influent. The resulting, contained, novel boron-modified alumina can be used "as is" in the novel process or recontainerized to suit the equipment outlay of the process.

Alternatively, as indicated previously, the alumina may be borated in situ by the flow of the first few column volumes of silica-containing solution through the alumina column.

The procedure of silica removal is normally carried out with water, e.g., from pressurized water reactors, containing 600–3000 ppm of boron, but higher boron contents can be tolerated. As the amount of boron goes up the efficiency goes down. Our data show that with water containing 3000 ppm of boron the capacity of silica removal dropped to 30% of the capacity with water having 1000 ppm of boron.

If the amount of aluminum in solution goes above 50 ppb then for some uses, e.g., in pressurized water reactors, it is necessary to remove the aluminum from the solution to prevent the formation of aluminum-containing deposits on the reactor tubes. This can be accomplished, for example, by passing the effluent from the alumina column through a cation exchange resin column. It has been found desirable to use a lithium loaded cation exchange resin, e.g., lithium loaded chelating resin comprising iminodiacetated styrene divinylbenzene copolymer.

The standard capacity of the alumina for silica is quite low. For example, about 0.08% of silicon, based on the weight of alumina, is adsorbable. Therefore, it is important to employ alumina which is initially substantially free of silica.

The alumina employed has a high surface area, i.e., it is activated alumina. The alumina should have a surface area of at least 20 square meters per gram of alumina. The upper limit with respect to surface area of the novel alumina does not appear to be critical providing that its standard capacity value is within the aforesaid range of from about $10^{-5}$ to about $10^{-1}$ gram Si/gram $Al_2O_3$. An upper limit of approximately 2,000 square meters per gram of alumina would appear to be suitable and practical in the practice of the invention. It can have a mesh size (Tyler screen) of about 6 to 400 mesh, preferably 20 to 200 mesh. Chromatographic type alumina has been found to be satisfactory.

While it has been found that Fisher Scientific Co. cat. #A-540 (Fisher Adsorption Alumina) works satisfactorily; it has further been found that Fisher Certified Alumina-Neutral-Brockman Activity 1(#A-950) is much superior thereto as the alumina to be employed in the adsorption column. This is apparently due to the fact that the Fisher Adsorption Alumina already had some silicate which reduced its capacity.

FIG. 1 is a schematic view of the primary coolant system of a typical pressurized water reactor, modified to include the improvements in the purification cycle described in the present disclosure.

According to FIG. 1 where a typical reactor system is shown for purposes of illustration only, primary coolant passes from a pressurized water reactor core 11 to a steam generator 10, i.e., a heat exchanger with the secondary coolant. Coolant is normally recycled to the reactor core via primary coolant pump 15. Coolant may also be bled off via a letdown line 12. The temperature of the spent coolant is further reduced in one or more heat exchangers 5. The coolant in line 12 can be withdrawn at drain 1 by regulating valve 1 and removed completely from the cycle for disposal or off-site treatment, or, under normal circumstances, purified and recycled. The purification system of the present disclosure centers around a column 14 containing a bed of borate-containing alumina to remove silica impurities without substantially changing the borate concentration of the coolant solution. Other purification media may include a chelating or a strong acid cation exchanger 19 to remove cationic impurities as well as dissolved Al traces originating in the borated containing alumina column. Another cation exchanger 18 may precede the alumina column 14 to remove cationic impurities before the passage through the alumina column instead of, or in addition to, the post-alumina removal cation exchanger 19. Other options include a storage tank 17 where the solution can stand to cool in order to optimize the efficiency of the purification system, and a wash tank 13 with a drain 2 to permit washing, and possibly regeneration, of the purification system. The purified coolant is either recycled directly to the reactor primary coolant stream through feed line 16 and reheater 6, entering the coolant stream between the primary coolant pump 15 and the reactor core 11, or returned through line 22 to the fresh coolant supply 20 to be subsequently fed back in to the coolant stream through a pressurizer 21.

The present invention is further illustrated by the following illustrative nonlimiting examples: The novel process can comprise, consist essentially of, or consist of the steps set forth. The aqueous solutions treated for silica removal can comprise, consist essentially of or consist of the materials set forth.

EXAMPLE 1

This Example relates to determination of the standard capacity of alumina for borate sorption as a function of borate concentration in solution.

A stock solution of 5000 ppm boron (dissolved as $H_3BO_3$), also containing approximately 15 ppm lithium (dissolved as LiOH) was prepared using distilled deionized water as a solvent. The pH of the resulting solution was 5.7. This stock solution was diluted with distilled deionized water to give several test solutions at lower concentrations, but with the same B:Li ratio and the same pH as the stock solution. In addition, a solution made up of 2800 ppm B (introduced as $H_3BO_3$), 1000 ppm Na (introduced as NaOH) and 5 ppm Cs (introduced as $CsNO_3$) was also tested. This latter solution had a higher pH of 7.8.

After analyzing each of the test solutions, a volume of 180 ml of each was stirred for a period of 3.5 days, together with 4.50 grams of neutral alumina, Fisher Scientific Co. #A-950, Brockman activity 1, 80-200 mesh, certified, for chromatography. At the end of the stirring period the alumina powder from each test was filtered, washed three times with a total volume of 450 ml of deionized water, and stirred for 14 hours with 25 ml of 1 M KOH in order to dissolve the surface layers of the alumina and the borate sorbed on or into these layers. The alumina was separated from the KOH extract by filtration and washed several times with a total volume of 25 ml of deionized water. The KOH extracts were combined with this wash water to give a total volume of 50 ml, which was then analyzed. The results are shown in Table I below. In addition to the amount of chemically sorbed boron which is not removed during the initial water washes (it can be re-extracted when the alumina is partially dissolved in KOH), Table I specifies the total amount of sorbed boron, calculated from the reduction in boron concentration of each test solution which is observed after the solution has been stirred with the alumina.

TABLE I
BORATE ADSORPTION ON ALUMINA

| pH of Test Solution | Boron Concentration in Test Solution, ppm | Lithium Concentration in Test Solution, ppm | Weight of Boron Chemically Sorbed and Re-Extracted, gram per 1 gram of $Al_2O_3$ | Total Sorbed Boron, gram per 1 gram of $Al_2O_3$ |
|---|---|---|---|---|
| 5.7 | 5166 | 13.25 | 0.002346 | 0.007155 |
| 5.7 | 1535 | 3.75 | 0.002274 | 0.005904 |
| 5.7 | 460.0 | 1.22 | 0.001846 | 0.003444 |
| 5.7 | 82.66 | 0.212 | 0.000196 | 0.001279 |
| 5.8 | 2778 | 1004* | 0.003605 | 0.007378 |

*$Na^+$ used in lieu of $Li^+$.

In all cases, analysis of the initial feed, filtrate and water wash solutions showed that in addition to the amount of boron indicated in the last column, which represents boron strongly bound to the alumina, about twice that amount in each case was weakly trapped or adsorbed on the alumina and subsequently removed during the water wash.

The results presented in Table I show that at a constant pH borate sorption initially shows a strong dependence on boron concentration in the feed solution at low boron concentrations, e.g., the amount of sorbed boron increases by a factor of 9.4 when boron concentration is increased from 83 to 460 ppm. However, at higher boron concentrations this dependence becomes much weaker, and as the concentration is further increased from 460 to 5200 ppm the amount of boron adsorption only increases by 27%, indicating that the alumina under these conditions is borated close to its saturation level. The results also show that borate sorption is enhanced by an increase in pH from 5.7 to 7.8.

EXAMPLES 2-4

These Examples measure transient composition effects in the passage of borate solutions through an alumina column.

Three column runs were carried out in order to characterize the effects of the passage of aqueous borate solutions through alumina columns on their composition and pH, with a particular emphasis upon transient changes in composition at the early stages of each run. Each of the three runs characterized the effects at a different level of boron concentration in the feed solution. The three boron concentrations investigated were 500 ppm B, 998 ppm B, and 2750 ppm B, respectively.

Prior to each run a polystyrene column with a cross-section of 2.85 $cm^2$ (0.442 $in^2$) was loaded with 50 g of neutral alumina, Camag 507-C, Brockman activity 1, 80-200 mesh, for chromatography (lot #677812). The alumina was backwashed to remove fines (about 20% of its initial volume). The final height was 15.8 cm (6.2 in), corresponding to a volume of 44.9 $cm^3$ (2.74 $in^3$). The flow rate during the column runs was 50 ml/min, corresponding to 17.5 ml/$cm^2$ min or 258 gal/$ft^2$ hr. The results of the three runs (Examples 2-4) are shown in Tables II-IV below.

TABLE II

| | | Influent Composition | Column Effluent Composition, After Passing n Column Volumes | | | | | |
|---|---|---|---|---|---|---|---|---|---|
| n | | ↓ | 0 | 1.2 | 2.4 | 3.6 | 4.7 | 9.3 | 18.1 |
| pH | | 6.2 | 6.7 | 6.9 | 7.0 | 7.1 | 7.1 | 6.5 | 6.2 |
| Al | ppm | 0.019 | 1.50 | 1.63 | 1.80 | 2.18 | 1.82 | 0.061 | 0.019 |
| Li | ppm | 1.09 | 0.007 | 0.002 | <0.002 | <0.002 | 0.0026 | 0.68 | 0.96 |
| B | ppm | 500 | 13 | <5 | <5 | <5 | 5 | 335 | 485 |

TABLE III

| | | Influent Composition | Column Effluent Composition After Passing n Column Volumes | | | | | |
|---|---|---|---|---|---|---|---|---|---|
| n | | ↓ | 0 | 1.0 | 2.0 | 3.0 | 4.0 | 7.9 | 15.8 |
| pH | | 6.5 | 7.0 | 7.25 | 7.80 | 7.55 | 7.20 | 6.65 | 6.5 |
| Al | ppm | 0.11 | 0.75 | 0.71 | 0.70 | 0.79 | 0.36 | 0.97 | 0.69 |
| Li | ppm | 5.83 | <0.002 | <0.002 | 0.076 | 1.83 | 4.28 | 5.71 | 5.70 |
| B | ppm | 998 | 10 | 8 | 5 | 102 | 383 | 922 | 979 |

TABLE IV

| | | Influent Composition | Column Effluent Composition After Passing n Column Volumes | | | | | |
|---|---|---|---|---|---|---|---|---|---|
| n | | ↓ | 0 | 1.2 | 2.5 | 3.7 | 5.0 | 9.97 | 19.7 |
| pH | | 5.0 | 7.2 | 5.6 | 5.5 | 5.4 | 5.2 | 5.05 | 5.0 |
| Al | ppm | 0.029 | 1.71 | 0.33 | 0.17 | 0.15 | 0.096 | 0.085 | 0.073 |
| Li | ppm | 0.96 | 0.007 | 0.22 | 0.52 | 0.68 | 0.77 | 0.90 | 0.93 |
| B | ppm | 2750 | 255 | 1752 | 2362 | 2407 | 2467 | 2700 | 2837 |

The results show that the treatment of solutions containing moderate levels (500–2750 ppm) of boron with fresh water-washed alumina results in considerable pertubation of the composition during the passage of the first column volumes of solution through the column. During this period, the pH may rise by more than two units, apparently reflecting the displacement of hydroxyl groups on the surface of the alumina by borate groups, and causing dissolution of appreciable levels (up to 2 ppm) of $Al^{+++}$. The levels of lithium and, in particular, boron virtually approach zero during this initial period, and thereafter recover slowly. These transient effects take longer periods of time to decay the smaller the concentration of boron in the influent and, in general, require between 10–20 column volumes to decay away almost completely in solutions containing 2750–500 ppm B. In addition to the species included in Tables II–IV above, the influent in each run also contained 1000 ppb of Si (introduced as a dilute solution of sodium silicate in deionized water). However, in each run the Si level in the effluent (from 0 to 35 volumes) remained below 100 ppb.

EXAMPLE 5

The effect of pre-borating the alumina by passing through it a solution containing boron in the concentration range of interest was studied. This method was based on the observations that at levels above 460 ppm B in the feed solution the alumina approaches a saturated condition and borate sorption becomes, to a large extent, independent of further increases in B levels in the feed solution (note Example 1).

A polystyrene column with a cross-section of 2.85 $cm^2$ (0.442 $in^2$) was loaded with 50 g of neutral alumina, Fisher Scientific Co. #A-950, Brockman activity 1, 80–200 mesh, certified, for chromatography. The alumina was backwashed to remove fines (about 20% of its initial volume). The final height was 14.6 cm (5.75 in), corresponding to a volume of 41.6 $cm^3$ (2.54 $in^3$). The flow rate during the column runs was 50 ml/min, corresponding to 17.5 $ml/cm^2$ min or 258/gal/$ft^2$ hr.

Two different feed solutions were passed through the column one after the other. The purpose of passing 36.6 column volumes of the first solution, which contained approximately 2000 ppm B, was to pre-treat the column and bring it to equilibrium with a borate level in the range of interest. The purpose of passing 50.1 column volumes of the second solution, which contained approximately 1000 ppm B, was to test the extent to which the transient concentration effects occur under conditions where the pre-borated column is exposed to borate levels which, while lying within the range of interest (between about 500 and 3000 and upwards to about 5000 ppm B), are considerably different from the concentration of borate in the solution used in the pre-treatment stage. The results of this test are to be compared with the results concerning the magnitude of the transient composition effects observed when the borate solution passes through a column of fresh, water-washed alumina. Results of the latter type are available both from monitoring the composition variations during the initial pre-treatment stage of the present experiment and from Examples 2–4.

The results of the two stages of the present experiment, i.e., the borate pre-treatment stage and the test of the pre-borated alumina, are presented in FIGS. 2–6.

Figure 2:
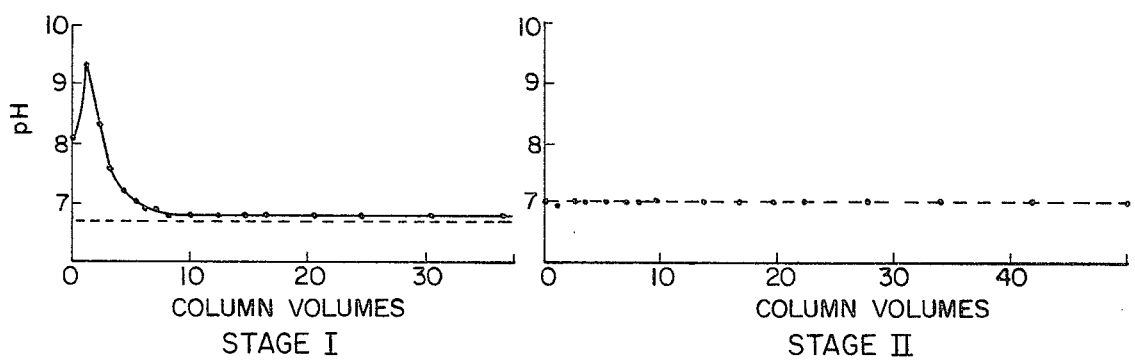
FIGS. 2-6 are graphs of data obtained in Example 5 showing respectively changes in pH, aluminum concentration, lithium concentration, boron concentration, and silica concentration, as flow through an alumina column progresses.
Figure 3:
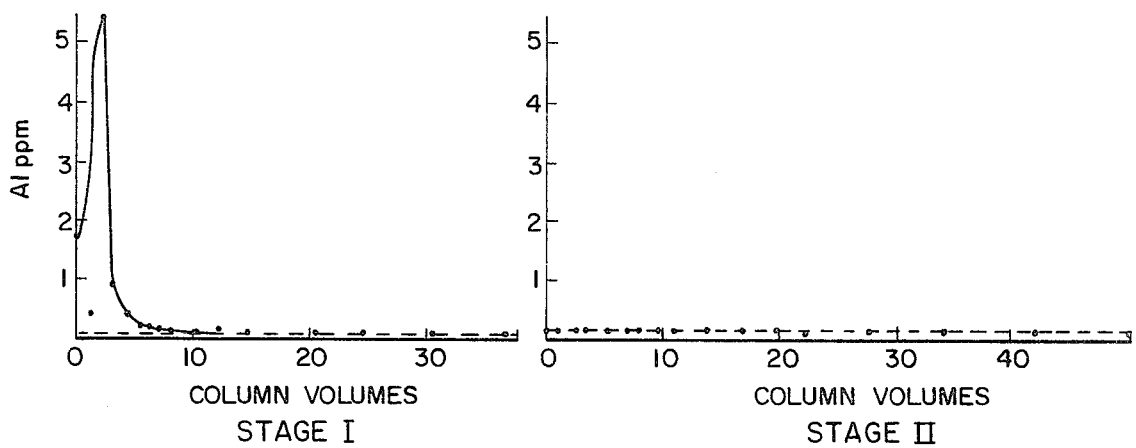
Figure 4:
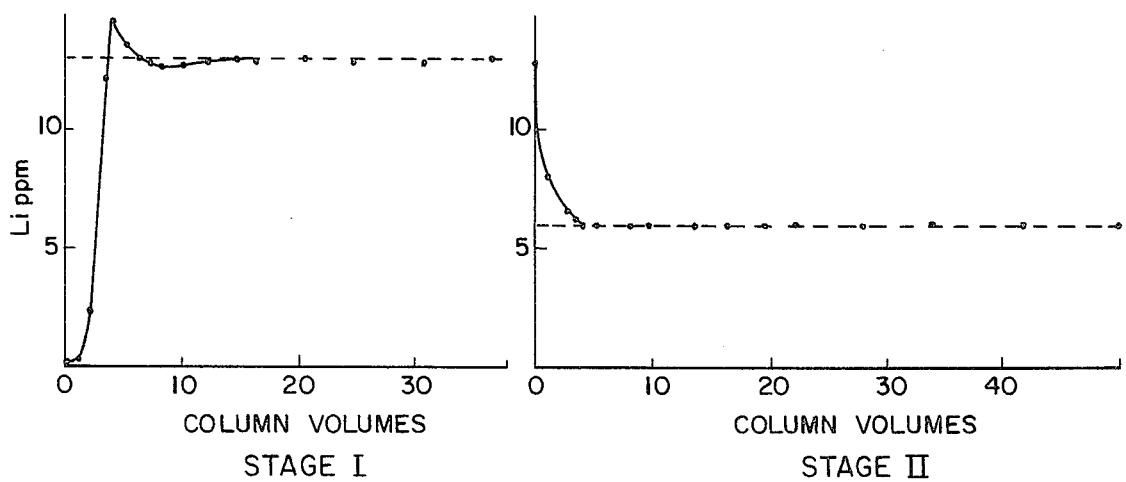
Figure 5:
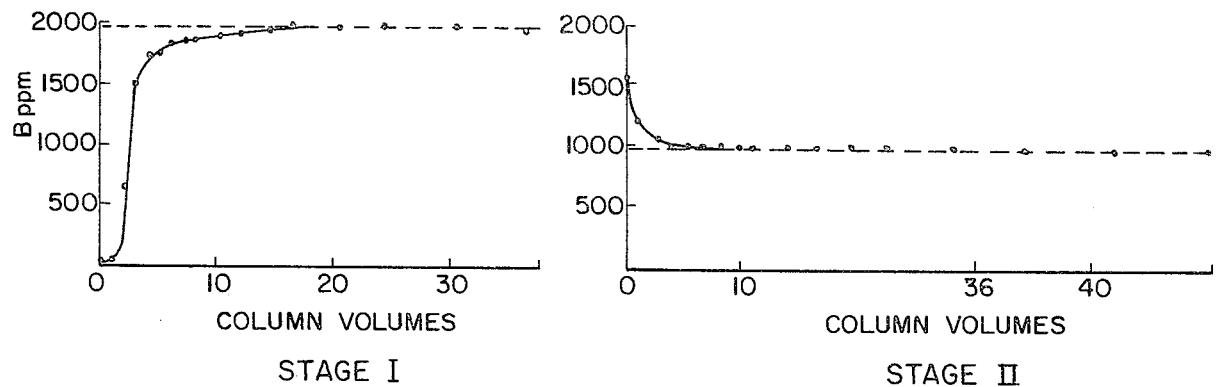
Figure 6:
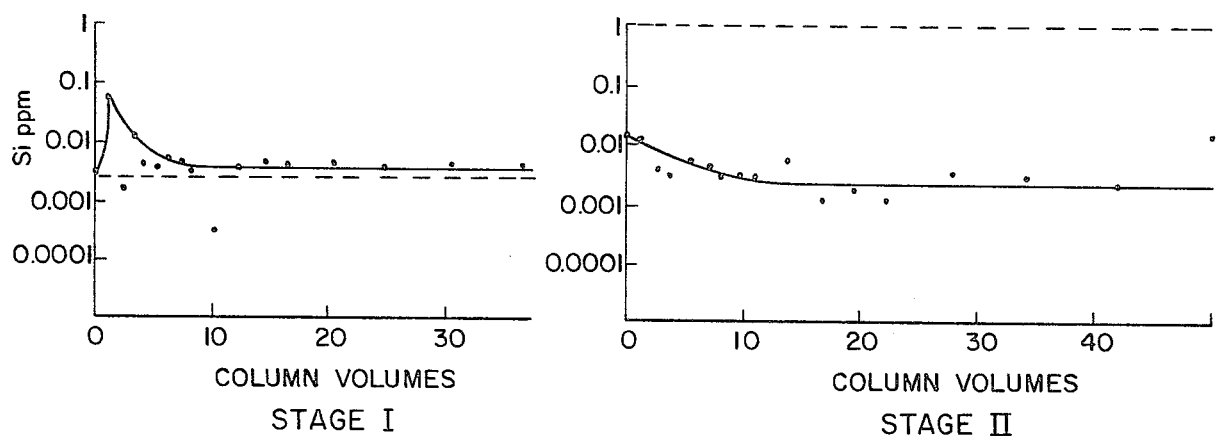

According to the data in FIG. 2, the pH rises by about 2.6 units during the passage of the first column volumes of the borate solution through the fresh, untreated alumina. This rise is accompanied by extraction of high levels (several ppm) of Al into the solution (FIG. 3). On the other hand, both pH rise and Al dissolution are completely eliminated when the pre-borated alumina of Example 5 is used. The passage through the untreated alumina also causes a drop in the Li (FIG. 4) and B (FIG. 5) levels by 2–3 orders of magnitude, and these concentrations are restored to levels close to the influent composition only after four column volumes have passed through. On the other hand, in the case where pre-borated alumina (the second stage of Example 5) is used there is a smooth and quick transition to the new concentration levels. Finally, while the flow through the untreated alumina causes a sharp transient of $SiO_2$ to pass into the solution (more than 0.1 ppm), apparently as a result of exchange of silica impurities initially present in the alumina with borate, this effect is eliminated in the case of the pre-borated alumina, where the initial silica levels in the influent do not exceed 0.026 ppm and stabilize within 2.5 column volumes at a level of approximately 0.007 ppm (FIG. 6). Likewise, additional experiments show that considerable levels of sodium (4–10 ppm) appear during the passage of the first eight column volumes through untreated alumina (this sodium also originates from residual sodium impurities in the alumina column material). These levels are brought down to 0.05 ppm after passing 25 column volumes of the pre-borating solution through the column.

In summary, it is demonstrated that the passage of borate solutions in the concentration range of interest (from about 500 to about 3000 and upwards to about 5000 ppm B) through a fresh, untreated alumina column results in very serious composition perturbation in the first several column volumes of the effluent. These effects include a sharp rise in pH (to values as high as 9-10), a related dissolution of high levels (several ppm) of Al, a depletion by as much as three orders of magnitude in B and Li levels, and extraction of the silica and sodium impurities present in the column material into the solution. All these effects can be minimized and almost completely eliminated by means of pre-treating the alumina with several column volumes of a solution containing a borate concentration within the above-mentioned range.

In the Figures, dash lines on the graphs indicate influent pH or concentrations.

EXAMPLE 6

A column run was carried out in order to characterize the performance of an alumina column through out the entire period during which such a column is capable of removing silica. A silica-containing aqueous borate solution was run through a column until saturation was reached, i.e., until silica concentration in the effluent leveled off and became equal to the concentration in the influent; note FIG. 7. The pH and the concentrations of all major species were monitored at short intervals throughout the run.

A polystyrene column with a cross-section of 2.85 cm$^2$ (0.442 in$^2$) was loaded with neutral alumina, Fisher Scientific Co. #A-950, Brockman Activity 1, 80–200 mesh, certified, for chromatography. The alumina was backwashed to remove fines. The weight of the alumina in the column was 30 g. The specific gravity of the column material was 0.83 (dry) or 0.70 (backwashed and based on the dry weight of alumina). The final height was 15.2 cm (6 in), corresponding to a volume of 43.4 cm$^3$ (2.65 in$^3$). The flow rate during the column runs was 20 ml/min. corresponding to 7.0 ml/cm$^2$min or 103 gal/ft$^2$hr. The operating temperature was 30° C. and the operating pressure drop was 1.1 atm/m (5.0 psi/ft).

During the initial period prior to complete saturation with borate transient composition effects are observed. The data for the initial stage of the column operation showed that the boration process is virtually completed by the time 6 column volumes of the influent have passed through the column, and by then the pH and concentrations in the column effluent approximated those of the influent. These transient effects include an initially high pH of 7.5, initially high levels of dissolved Al (about 0.5 ppm) and Na (about 4.5 ppm) and an initially low level of Li (0.5 ppm). At the end of the passage of 6 column volumes, the column is borated at a saturation level of the order of 0.44% B, (Note: this applies to total sorbed B, without any attempt, unlike Example 1, to distinguish between chemically bound and physically absorbed boron) and from then on the concentration of boron in the effluent throughout subsequent operation (up to at least 820 column volumes) is the same as in the influent. The concentrations of Li and Na and the pH of the effluent are also identical to the corresponding concentrations in the influent, and the concentration of dissolved Al in the effluent remains constant at approximately 0.06 ppm (compared with about 0.03 ppm Al in the influent).

The composition of the influent and the effluent at the point where 153 column volumes have passed through is given in Table V below.

TABLE V

| | | concentration, ppm | | | | |
|---|---|---|---|---|---|---|
| | pH | Si | B | Li | Na | Al |
| Influent composition | 6.6 | 1.000 | 1000 | 3.80 | 1.64 | 0.030 |
| Effluent composition | 6.6 | <0.002 | 1000 | 3.80 | 1.64 | 0.062 |

After 170 column volumes have passed through, silica is first detected in the effluent. The breakthrough for the indicated levels of silica is given in the following Table VI below.

TABLE VI

| Breakthrough Si, ppm | 0.002 | 0.023 | 0.047 | 1.00 |
|---|---|---|---|---|
| Column Volumes | 170 | 220 | 270 | 755 |
| Total Si sorbed, g Si/gAl$_2$O$_3$ | 2.2 × 10$^{-4}$ | 3.3 × 10$^{-4}$ | 4.3 × 10$^{-4}$ | 7.6 × 10$^{-4}$ |

Figure 7:
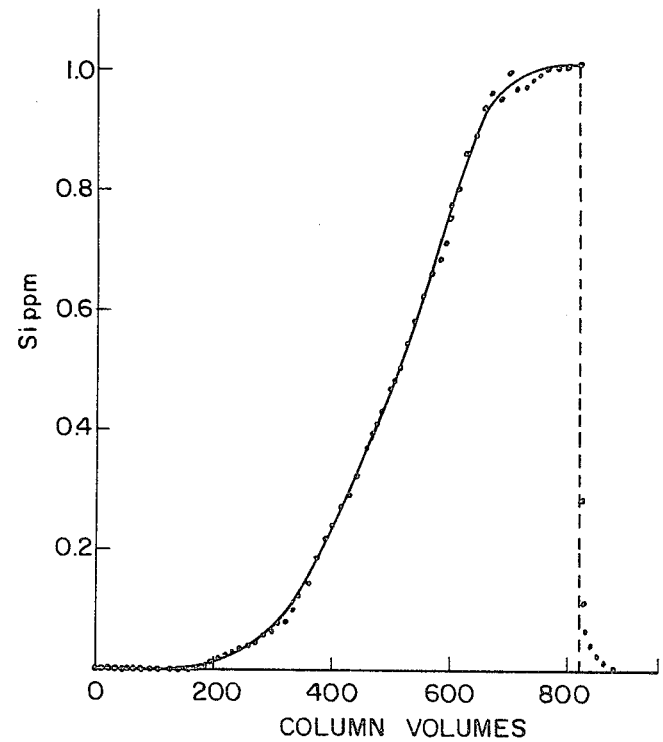
FIG. 7 is a graph of silica concentration vs. column flow based on Example 6 data, with the flow continued until after the column became saturated with silica.

Referring to FIG. 7, after 820 column volumes had passed through and the column had become fully saturated with respect to silica as well as borate, 55 column volumes of deionized water were passed through to test the effluent for washout of sorbed species. It was found that the levels of washed-out species in the effluent at the end of this period were negligible, i.e., 0.002 ppm Si, 1 ppm B, 0.01 ppm Na, 0.02 ppm Al.

EXAMPLE 7

Example 6 was repeated but this time the operating temperature was 60° C. The results as to Si capacity (curve of silica vs. column volumes) were virtually identical to those in Example 6. However, at 60° C. the Al level in the effluent was about 0.45 ppm compared to about 0.06 ppm in Example 6.

EXAMPLE 8

Example 6 was repeated but the borate solution used as influent in this case contained 3000 ppm B, 1.00 ppm Si, 13.7 ppm Li and 1.83 ppm Na. The pH was 6.2. The temperature of the run was 29° C. The capacity calculated as in Example 6 was 2.2×10$^{-4}$ g Si/gAl$_2$O$_3$ (4.7×10$^{-4}$ g SiO$_2$/gAl$_2$O$_3$), i.e., about one-third the capacity measured in Example 6. As in Example 6, there were about 0.06 ppm Al in the effluent.

EXAMPLE 9

A Pyrex glass column with a cross-section of 6.16 cm$^2$ (0.955 in$^2$) was loaded to a height of 8 cm (3.1 in) with the same type of alumina as the one used in Example 6. A second column, made of polystyrene and having a cross-section of 2.85 cm$^2$ (0.442 in$^2$), was loaded to a height of 11 cm (4.3 in) with Chelex-100 Chelating Resin, Analytical Grade, 100–200 mesh, Bio-Rad Laboratories #142-2832. The resin was previously washed with 1M LiOH, water, ethanol, water and 1M HNO₃ and converted to the Li+ form with a solution containing 1000 ppm B and 10 ppm Li at pH 6.5. The volumes of the two column beds were 49.3 cm³ (3.01 in³) and 31.4 cm³ (1.91 in³), respectively. An influent containing approximately 0.6 ppm Si, 1000 ppm B, 10 ppm Li, and having a pH of 6.6 was passed through the first column at a flow rate of 8 ml/min (1.30 ml/cm²min or 19.1 gal/ft²hr), sampled, and then passed through the second column at a flow rate of 3.3 ml/min (1.16 ml/cm²min or 17.1 gal/ft²hr). After initial composition perturbations had disappeared during the passage of the first few column volumes, when both columns had reached equilibrium with the influent, the composition of the effluent of the second column remained very similar to that of the effluent of the first column throughout the run, except for a consistent, significant lowering of Al concentrations from about 0.55 ppm Al to about 0.018 ppm Al and a virtually complete replacement of Na by Li. Both effluent compositions were very similar to the influent composition except for elimination of the silica. The compositions of the influent and the two effluents after 4.5 liters (1.19 gal; 91 column volumes with respect to the first column or 144 column volumes with respect to the second column) have passed through are given in Table VII below.

TABLE VII

|  | pH | Concentration, ppm | | | | |
|---|---|---|---|---|---|---|
|  |  | Si | B | Li | Na | Al |
| Influent | 6.6 | 0.580 | 1063 | 10.5 | 1.81 | 0.016 |
| Effluent of first (alumina) column | 6.6 | <0.002 | 1068 | 10.5 | 1.80 | 0.057 |
| Effluent of second (Chelex-100) column | 6.6 | <0.002 | 1058 | 11.1 | <0.01 | 0.021 |

SUMMARY OF EXAMPLES 6-9

Example 6 shows that in typical PWR primary coolant streams which contain about 1000 ppm B and about 1 ppm Si, the use of a borated alumina column can result in elimination of >99.8% of the silica in solution until 170 column volumes have passed through, or >95% of the silica until 275 column volumes have passed through. The capacity of the alumina was $8 \times 10^{-4}$ gSi/gAl₂O₃. During the entire period between the initial boration and complete saturation with Si, and even afterwards, the levels of B, Li, and Na as well as the pH remain unaffected by the column, and the concentration of dissolved alumina is only 0.03 ppm Al at 30° C. Water flow through the saturated column does not result in appreciable wash-out of ions from the column.

Example 7 shows that increasing the temperature from 30° C. to 60° C., which is at the upper limit of the expected temperature range for primary coolant purification, does not affect the performance of the column except for a substantial increase in dissolved Al levels.

Example 8 shows that increasing the B concentration from 1000 to 3000 ppm, which is about at the upper limit of the expected composition range for the primary coolant, leads to a reduction of about two-thirds in the capacity of the alumina. The column, however, is still operational and the increase in B levels does not lead to an increase in the extent of Al dissolution.

Example 9 shows that a substantial reduction in dissolved Al levels from the alumina column effluent can be accomplished through the use of a chelating cation exchange resin in a second column, while the performance of the combined system with respect to Si, B and Li levels remains about identical to that of the alumina column alone. Al levels can be reduced by two-thirds to values around 0.02 ppm. This is important especially if the alumina column were to be operated at elevated temperatures (cf. Example 7). Any Na present in the alumina column effluent is also removed and replaced by Li.

We claim:

1. A process of removing silica from an aqueous medium containing borate and silica, the amount of borate being at least about 100 times as great as the amount of silica, comprising passing the medium through alumina substantially saturated with borate and containing substantially less silica contamination than its capacity for silica to selectively remove silica and leave the borate concentration substantially unchanged.

2. A process according to claim 1 wherein said aqueous medium contains about 100 to 10,000 times as much borate as silica.

3. A process according to claim 2 wherein said aqueous medium initially contains 0.3 to 10 ppm silica calculated as silicon.

4. A process according to claim 3 wherein said aqueous medium contains from about 500 to about 4000 ppm of borate calculated as boron.

5. A process according to claim 3 wherein the concentration of silica in said aqueous medium is reduced to below about 50 ppb calculated as silicon.

6. A process according to claim 3 wherein the pH of said aqueous medium is from about 5 to about 8.

7. A process according to claim 1 wherein the alumina has a standard capacity for silica of about $10^{-5}$ to $10^{-1}$ gram of silica (calculated as silicon) per gram of alumina.

8. A process according to claim 7, further comprising passing silica-poor effluent from the alumina contacting step through a lithium loaded cation exchange resin to reduce the amount of aluminum in the solution.

9. A process according to claim 1, further comprising pretreating the alumina with a different borate-containing aqueous medium to substantially saturate the alumina with borate.

10. A process according to claim 1, wherein the alumina is substantially saturated with borate by contact with an initial portion of said aqueous medium.

11. In a nuclear reactor coolant system employing an aqueous coolant which contains borate to control the neutron flux and silica as an impurity and wherein the coolant in said system is purified and then recycled, the aqueous coolant containing at least about 100 times as much borate as silica, the improvement which comprises contacting said coolant with borate-containing alumina to selectively remove silica while leaving the borate concentration of said solution substantially unchanged.

12. A process according to claim 11 wherein said borate-containing alumina is first prepared by impregnating alumina with a borate-containing solution for a period of time sufficient to substantially saturate the alumina with borate and thereafter employing the borated-alumina as the medium to remove silica from said coolant.

13. A process according to claim 11, further comprising passing said coolant after contact with said borate-containing alumina through a cation exchange resin to remove aluminum therefrom.

14. A process according to claim 13 wherein the cation exchange resin is a lithium loaded caton exchange resin.

15. A process according to claim 11 wherein said coolant has a pH of about 5 to about 8 and the alumina has a standard capacity for silica of about $10^{-5}$ to $10^{-1}$ gram of silica (calculated as silicon) per gram of alumina.

16. A process according to claim 15 wherein said coolant contains from about 0.2 to about 10 ppm of lithium.

* * * * *